US012746988B2

(12) United States Patent
Pournazeri et al.

(10) Patent No.: US 12,746,988 B2
(45) Date of Patent: Sep. 29, 2026

(54) DRIVER-VEHICLE INTERACTION FOR ACTIVE DOWNFORCE CONTROL

(71) Applicant: GM Global Technology Operations LLC, Detroit, MI (US)

(72) Inventors: Mohammad Pournazeri, Etobicoke (CA); Mansour Ataei, Richmond Hill (CA); Reza Hajiloo, Richmond Hill (CA); Ehsan Asadi, Markham (CA); Mustafa Hakan Turhan, Kitchener (CA); SeyedAlireza Kasaiezadeh Mahabadi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 195 days.

(21) Appl. No.: 18/814,966

(22) Filed: Aug. 26, 2024

(65) Prior Publication Data

US 2026/0054781 A1 Feb. 26, 2026

(51) Int. Cl.
*B62D 37/02* (2006.01)
*B60W 30/02* (2012.01)

(52) U.S. Cl.
CPC ............. *B62D 37/02* (2013.01); *B60W 30/02* (2013.01); *B60W 2520/125* (2013.01); *B60W 2540/10* (2013.01); *B60W 2540/12* (2013.01)

(58) Field of Classification Search
CPC .................. B62D 37/02; B60W 30/02; B60W 2520/125; B60W 2540/10; B60W 2540/12
See application file for complete search history.

(56) References Cited

U.S. PATENT DOCUMENTS

| | | | |
|---|---|---|---|
| 9,168,950 | B1 | 10/2015 | Chanda et al. |
| 10,035,548 | B2 | 7/2018 | Barber et al. |
| 10,596,902 | B2 | 3/2020 | Lim et al. |
| 12,403,962 | B2 | 9/2025 | Allmandinger et al. |
| 2002/0029102 | A1 | 3/2002 | Badenoch |
| 2003/0163237 | A1 | 8/2003 | Kim |
| 2005/0189161 | A1 | 9/2005 | Zheng et al. |
| 2005/0222731 | A1 | 10/2005 | Ghoneim |
| 2013/0218396 | A1 | 8/2013 | Moshchuk et al. |
| 2013/0226414 | A1 | 8/2013 | De et al. |

(Continued)

FOREIGN PATENT DOCUMENTS

| | | |
|---|---|---|
| CN | 114084140 A | 2/2022 |
| DE | 102011111934 A1 | 2/2013 |

(Continued)

OTHER PUBLICATIONS

Pournazeri, M., et al. U.S. Appl. No. 18/350,508, filed Jul. 11, 2023.

(Continued)

*Primary Examiner* — Wade Miles
*Assistant Examiner* — James Brian Chin
(74) *Attorney, Agent, or Firm* — Vivacqua Crane, PLLC

(57) ABSTRACT

A method for active downforce control for a vehicle may include determining an out-of-phase interaction index between a driver of the vehicle and a controller. The controller is configured to control one or more aerodynamic actuators. The method further may include determining one or more active downforce control inputs based at least in part on the out-of-phase interaction index. The method further may include controlling the one or more aerodynamic actuators based at least in part on the one or more active downforce control inputs.

20 Claims, 3 Drawing Sheets

(56) References Cited

U.S. PATENT DOCUMENTS

| | | | |
|---|---|---|---|
| 2016/0221613 | A1 | 8/2016 | Handzel, Jr. |
| 2017/0088106 | A1 | 3/2017 | Fahland et al. |
| 2018/0281857 | A1 | 10/2018 | Choi et al. |
| 2019/0100194 | A1 | 4/2019 | Fahland et al. |
| 2019/0256094 | A1 | 8/2019 | Kasaiezadeh Mahabadi et al. |
| 2019/0263458 | A1 | 8/2019 | Fahland et al. |
| 2020/0339135 | A1 | 10/2020 | Kasaiezadeh Mahabadi et al. |
| 2022/0161874 | A1 | 5/2022 | Nahidi et al. |
| 2022/0363322 | A1 | 11/2022 | Allmandinger et al. |
| 2023/0038657 | A1 | 2/2023 | Bartels |
| 2023/0105572 | A1 | 4/2023 | Asadi et al. |
| 2024/0101132 | A1 | 3/2024 | Šoštaric et al. |
| 2024/0166216 | A1 | 5/2024 | Park et al. |
| 2026/0028069 | A1 | 1/2026 | Turhan et al. |
| 2026/0028070 | A1 | 1/2026 | Turhan et al. |

FOREIGN PATENT DOCUMENTS

| | | | |
|---|---|---|---|
| DE | 102020116851 | A1 | 12/2021 |
| EP | 4385845 | A1 | 6/2024 |

OTHER PUBLICATIONS

Turhan, M., et al. U.S. Appl. No. 18/787,480, filed Jul. 29, 2024.

United States Patent and Trademark Office. U.S. Appl. No. 18/350,508, filed Jul. 11, 2023.

United States Patent and Trademark Office. U.S. Appl. No. 18/787,480, filed Jul. 29, 2024.

"Cutler, Mark; How, Jonathan; Autonomous Drifting using Simulation-Aided Reinforcement Leaming; 2016; 2016 IEEE International Conference on Robotics and Automation (ICRA)" (Year: 2016).

"Yu, Wei; Gao, Wei; A Review of the influence of active aerodynamic tail on vehicle handling stability; 2021; Hubei Key Laboratory of Automotive Power Train and Electronic Control, Hubei University of Automotive Technology, Shiyan, China" (Year: 2021).

DRIVER-VEHICLE INTERACTION FOR ACTIVE DOWNFORCE CONTROL

INTRODUCTION

The present disclosure relates to systems and methods for control of active downforce systems for a vehicle.

To increase vehicle performance and capability, vehicles may be equipped with active downforce systems to provide increased traction or otherwise adjust vehicle handling characteristics under certain conditions. For example, vehicles may include one or more aerodynamic elements, such as spoilers, fins, wings, diffusers, and/or the like, which may be moved or adjusted using electromechanical, hydraulic, and/or pneumatic actuation systems. The actuation systems can precisely control the position and angle of the aerodynamic elements to induce front and/or rear downforce on the vehicle. By generating additional downforce, the active downforce system may increase front and/or rear traction, thereby improving grip on the road surface. Increased traction may allow for more aggressive cornering, improved acceleration, and better braking performance. However, actions of vehicle active downforce systems may conflict with actions taken by the driver, resulting in "out-of-phase" interaction between the vehicle active downforce system and the driver.

Thus, while current active downforce systems and methods achieve their intended purpose, there is a need for a new and improved system and method for active downforce control for a vehicle.

SUMMARY

According to several aspects, a method for active downforce control for a vehicle is provided. The method may include determining an out-of-phase interaction index between a driver of the vehicle and a controller. The controller is configured to control one or more aerodynamic actuators. The method further may include determining one or more active downforce control inputs based at least in part on the out-of-phase interaction index. The method further may include controlling the one or more aerodynamic actuators based at least in part on the one or more active downforce control inputs.

In another aspect of the present disclosure, determining the out-of-phase interaction index further may include monitoring one or more input parameters over time. Determining the out-of-phase interaction index further may include determining a magnitude of a change in one of the one or more input parameters. Determining the out-of-phase interaction index further may include determining the out-of-phase interaction index based at least in part on the magnitude of the change in the one of the one or more input parameters.

In another aspect of the present disclosure, monitoring the one or more input parameters over time further may include monitoring an accelerator pedal position over time. Monitoring the one or more input parameters over time further may include monitoring a brake pedal position over time. Monitoring the one or more input parameters over time further may include monitoring an estimated lateral acceleration of the vehicle over time.

In another aspect of the present disclosure, determining the out-of-phase interaction index further may include comparing the magnitude of the change in the one of the one or more input parameters to a predetermined change magnitude threshold. Determining the out-of-phase interaction index further may include increasing the out-of-phase interaction index in response to determining that the magnitude of the change in the one of the one or more input parameters is greater than or equal to the predetermined change magnitude threshold. Determining the out-of-phase interaction index further may include determining an elapsed time since the out-of-phase interaction index was last increased. Determining the out-of-phase interaction index further may include comparing the elapsed time to an elapsed time threshold. Determining the out-of-phase interaction index further may include resetting the out-of-phase interaction index to zero in response to determining that the elapsed time is greater than or equal to the elapsed time threshold.

In another aspect of the present disclosure, determining the one or more active downforce control inputs further may include determining an estimated ride height using one or more vehicle sensors. Determining the one or more active downforce control inputs further may include determining a modeled ride height. Determining the one or more active downforce control inputs further may include determining a blended ride height based at least in part on the estimated ride height, the modeled ride height, and the out-of-phase interaction index. Determining the one or more active downforce control inputs further may include determining the one or more active downforce control inputs, where the one or more active downforce control inputs includes at least the blended ride height.

In another aspect of the present disclosure, determining the modeled ride height further may include determining the modeled ride height using a mathematical relation which neglects effects of sudden driver inputs and road disturbances.

In another aspect of the present disclosure, determining the modeled ride height further may include determining a front modeled ride height based at least in part on a filtered longitudinal acceleration, a front downforce, a front spring preload, and a front spring constant. Determining the modeled ride height further may include determining a rear modeled ride height based at least in part on the filtered longitudinal acceleration, a rear downforce, a rear spring preload, and a rear spring constant.

In another aspect of the present disclosure, determining the blended ride height further may include determining the blended ride height using a formula:

$$RH_B = RH_m * i + RH_e * (1 - i)$$

where $RH_B$ is the blended ride height, $RH_m$ is the modeled ride height, i is the out-of-phase interaction index, and $RH_e$ is the estimated ride height, and where the out-of-phase interaction index is a number between zero and one.

In another aspect of the present disclosure, determining the one or more active downforce control inputs further may include determining a raw longitudinal acceleration. Determining the one or more active downforce control inputs further may include determining a filtered longitudinal acceleration based at least in part on the raw longitudinal acceleration and the out-of-phase interaction index. The one or more active downforce control inputs includes at least the filtered longitudinal acceleration.

In another aspect of the present disclosure, determining the one or more active downforce control inputs further may include determining a raw longitudinal tire force. Determining the one or more active downforce control inputs further may include determining a filtered longitudinal tire force based at least in part on the raw longitudinal tire force and the out-of-phase interaction index. The one or more active downforce control inputs includes at least the filtered longitudinal tire force.

According to several aspects, a system for active downforce control for a vehicle is provided. The system may include one or more vehicle sensors, one or more aerodynamic actuators, and a controller in electrical communication with the one or more vehicle sensors and the one or more aerodynamic actuators. The controller is programmed to determine an out-of-phase interaction index between a driver of the vehicle and the controller using the one or more vehicle sensors. The controller is further programmed to determine one or more active downforce control inputs based at least in part on the out-of-phase interaction index. The controller is further programmed to control the one or more aerodynamic actuators based at least in part on the one or more active downforce control inputs.

In another aspect of the present disclosure, to determine the out-of-phase interaction index, the controller is further programmed to monitor one or more input parameters over time using the one or more vehicle sensors. To determine the out-of-phase interaction index, the controller is further programmed to determine a magnitude of a change in one of the one or more input parameters. To determine the out-of-phase interaction index, the controller is further programmed to determine the out-of-phase interaction index based at least in part on the magnitude of the change in the one of the one or more input parameters.

In another aspect of the present disclosure, to monitor the one or more input parameters over time, the controller is further programmed to monitor an accelerator pedal position over time using an accelerator pedal position sensor of the one or more vehicle sensors. To monitor the one or more input parameters over time, the controller is further programmed to monitor a brake pedal position over time using a brake pedal position sensor of the one or more vehicle sensors. To monitor the one or more input parameters over time, the controller is further programmed to monitor an estimated lateral acceleration of the vehicle over time using the one or more vehicle sensors.

In another aspect of the present disclosure, to determine the out-of-phase interaction index, the controller is further programmed to compare the magnitude of the change in the one of the one or more input parameters to a predetermined change magnitude threshold. To determine the out-of-phase interaction index, the controller is further programmed to increase the out-of-phase interaction index in response to determining that the magnitude of the change in the one of the one or more input parameters is greater than or equal to the predetermined change magnitude threshold. To determine the out-of-phase interaction index, the controller is further programmed to determine an elapsed time since the out-of-phase interaction index was last increased. To determine the out-of-phase interaction index, the controller is further programmed to compare the elapsed time to an elapsed time threshold. To determine the out-of-phase interaction index, the controller is further programmed to reset the out-of-phase interaction index to zero in response to determining that the elapsed time is greater than or equal to the elapsed time threshold.

In another aspect of the present disclosure, to determine the one or more active downforce control inputs, the controller is further programmed to determine a raw longitudinal acceleration. To determine the one or more active downforce control inputs, the controller is further programmed to determine a filtered longitudinal acceleration based at least in part on the raw longitudinal acceleration and the out-of-phase interaction index. To determine the one or more active downforce control inputs, the controller is further programmed to determine a raw longitudinal tire force. To determine the one or more active downforce control inputs, the controller is further programmed to determine a filtered longitudinal tire force based at least in part on the raw longitudinal tire force and the out-of-phase interaction index. To determine the one or more active downforce control inputs, the controller is further programmed to determine an estimated ride height using the one or more vehicle sensors. To determine the one or more active downforce control inputs, the controller is further programmed to determine a modeled ride height. To determine the one or more active downforce control inputs, the controller is further programmed to determine a blended ride height based at least in part on the estimated ride height, the modeled ride height, and the out-of-phase interaction index. The one or more active downforce control inputs includes at least the filtered longitudinal acceleration, the filtered longitudinal tire force, and the blended ride height.

In another aspect of the present disclosure, to determine the modeled ride height, the controller is further programmed to determine a front modeled ride height based at least in part on a filtered longitudinal acceleration, a front downforce, a front spring preload, and a front spring constant. To determine the modeled ride height, the controller is further programmed to determine a rear modeled ride height based at least in part on the filtered longitudinal acceleration, a rear downforce, a rear spring preload, and a rear spring constant.

In another aspect of the present disclosure, to determine the blended ride height, the controller is further programmed to determine the blended ride height using a formula:

$$RH_B = RH_m * i + RH_e * (1 - i)$$

where $RH_B$ is the blended ride height, $RH_m$ is the modeled ride height, i is the out-of-phase interaction index, and $RH_e$ is the estimated ride height, and where the out-of-phase interaction index is a number between zero and one.

According to several aspects, a method for active downforce control for a vehicle is provided. The method may include monitoring one or more input parameters over time using one or more vehicle sensors. The method further may include determining a magnitude of a change in one of the one or more input parameters. The method further may include determining an out-of-phase interaction index based at least in part on the magnitude of the change in the one of the one or more input parameters. The method further may include determining one or more active downforce control inputs based at least in part on the out-of-phase interaction index. The method further may include controlling one or more aerodynamic actuators based at least in part on the one or more active downforce control inputs.

In another aspect of the present disclosure, determining the out-of-phase interaction index further may include comparing the magnitude of the change in the one of the one or more input parameters to a predetermined change magnitude threshold. Determining the out-of-phase interaction index further may include increasing the out-of-phase interaction index in response to determining that the magnitude of the change in the one of the one or more input parameters is greater than or equal to the predetermined change magnitude threshold. Determining the out-of-phase interaction index further may include determining an elapsed time since the out-of-phase interaction index was last increased. Determining the out-of-phase interaction index further may include comparing the elapsed time to an elapsed time threshold. Determining the out-of-phase interaction index further may include resetting the out-of-phase interaction index to zero in response to determining that the elapsed time is greater than or equal to the elapsed time threshold.

In another aspect of the present disclosure, determining the one or more active downforce control inputs further may include determining an estimated ride height using one or more vehicle sensors. Determining the one or more active downforce control inputs further may include determining a modeled ride height using a mathematical relation which neglects effects of sudden driver inputs and road disturbances. Determining the one or more active downforce control inputs further may include determining a blended ride height using a formula:

$$RH_B = RH_m * i + RH_e * (1 - i)$$

where $RH_B$ is the blended ride height, $RH_m$ is the modeled ride height, i is the out-of-phase interaction index, and $RH_e$ is the estimated ride height, and where the out-of-phase interaction index is a number between zero and one.

Determining the one or more active downforce control inputs further may include determining a raw longitudinal acceleration. Determining the one or more active downforce control inputs further may include determining a filtered longitudinal acceleration based at least in part on the raw longitudinal acceleration and the out-of-phase interaction index. Determining the one or more active downforce control inputs further may include determining a raw longitudinal tire force. Determining the one or more active downforce control inputs further may include determining a filtered longitudinal tire force based at least in part on the raw longitudinal tire force and the out-of-phase interaction index. Determining the one or more active downforce control inputs further may include determining the one or more active downforce control inputs, where the one or more active downforce control inputs includes at least the blended ride height, the filtered longitudinal acceleration, and the filtered longitudinal tire force.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Active downforce systems and methods for vehicles may be used to provide increased traction or otherwise adjust vehicle handling characteristics under certain conditions, improving vehicle performance. However, drivers may also adjust vehicle controls (e.g., acceleration, braking, steering, etc.) to control traction or otherwise adjust vehicle handling characteristics. In some cases, actions of vehicle active downforce systems may conflict with actions taken by the driver, resulting in "out-of-phase" interaction between the vehicle active downforce system and the driver. In some examples, out-of-phase interaction may occur due to differences in reaction time between the active downforce system and the driver. In other examples, out-of-phase interaction may occur when the active downforce system and the driver have opposed intentions (e.g., the active downforce system may seek to increase tire traction while the driver simultaneously seeks to decrease tire traction). Therefore, the present disclosure provides a new and improved system and method for active downforce control for a vehicle which mitigates out-of-phase interaction.

Figure 1:
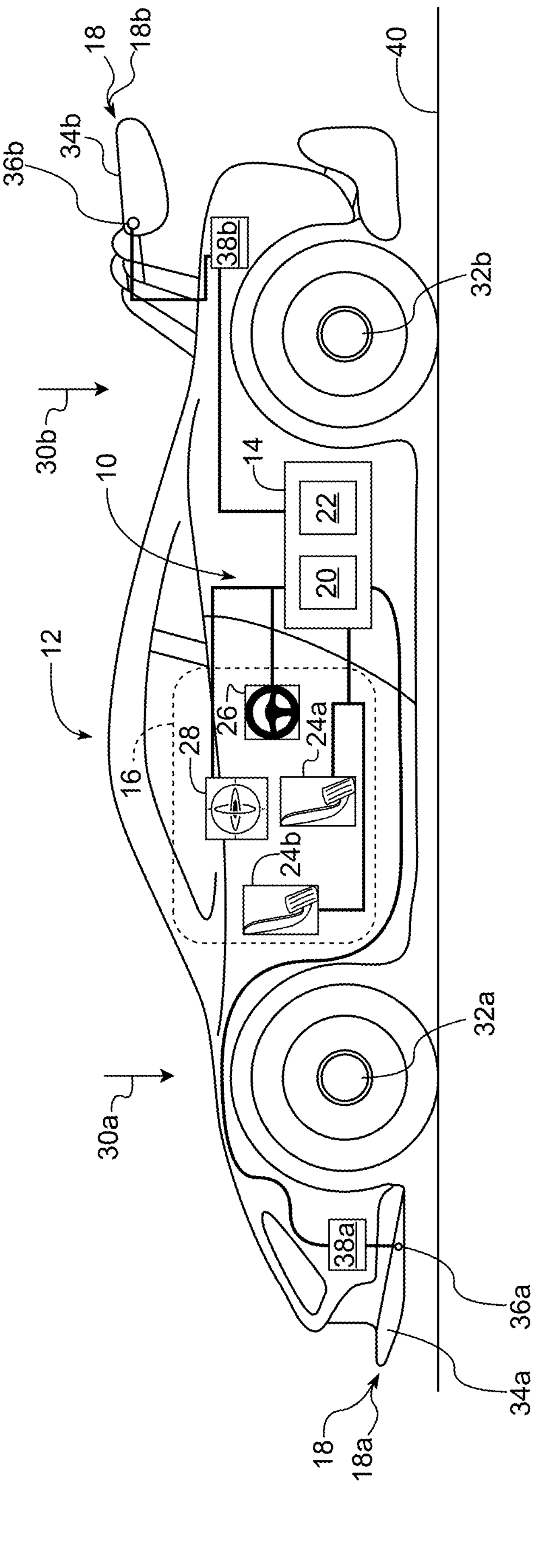
FIG. 1 is a schematic diagram of a system for active downforce control for a vehicle, according to an exemplary embodiment.

Referring to FIG. 1, a system for active downforce control for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, one or more vehicle sensors 16, and one or more aerodynamic actuators 18.

The controller 14 is used to implement a method 100 for active downforce control for a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions.

The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering wheel angle of the vehicle 12.

The controller 14 is in electrical communication with the one or more vehicle sensors 16 and the one or more aerodynamic actuators 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure. It should further be understood that, in the scope of the present disclosure, electrical communication also includes power and/or energy transfer between electrical devices (e.g., using conducting wires and/or wireless power transmission techniques).

The one or more vehicle sensors 16 are used to acquire information relevant to the vehicle 12. In an exemplary embodiment, the one or more vehicle sensors 16 includes an accelerator pedal position sensor 24*a*, a brake pedal position sensor 24*b*, a steering wheel angle sensor 26, and an inertial measurement unit (IMU) 28.

In another exemplary embodiment, the one or more vehicle sensors 16 further includes sensors to determine performance data about the vehicle 12. In a non-limiting example, the one or more vehicle sensors 16 further includes at least one of a motor speed sensor, a motor torque sensor, an electric drive motor voltage and/or current sensor, a brake position sensor, a coolant temperature sensor, a cooling fan speed sensor, a transmission oil temperature sensor, a front suspension ride height sensor, a rear suspension ride height sensor, a yaw rate sensor, one or more wheel speed sensors, and an inertial measurement unit (IMU).

In another exemplary embodiment, the one or more vehicle sensors 16 further includes sensors to determine information about an environment within the vehicle 12. In a non-limiting example, the one or more vehicle sensors 16 further includes at least one of a seat occupancy sensor, a cabin air temperature sensor, a cabin motion detection sensor, a cabin camera, a cabin microphone, and/or the like.

In another exemplary embodiment, the one or more vehicle sensors 16 further includes sensors to determine information about an environment surrounding the vehicle 12. In a non-limiting example, the one or more vehicle sensors 16 further includes at least one of an ambient air temperature sensor, a barometric pressure sensor, a vehicle communication system, a global navigation satellite system (GNSS), and/or a photo and/or video camera which is positioned to view the environment in front of the vehicle 12.

In another exemplary embodiment, at least one of the one or more vehicle sensors 16 is a perception sensor capable of perceiving objects and/or measuring distances in the environment surrounding the vehicle 12. In a non-limiting example, the one or more vehicle sensors 16 includes a stereoscopic camera having distance measurement capabilities. In one example, at least one of the one or more vehicle sensors 16 is affixed inside of the vehicle 12, for example, in a headliner of the vehicle 12, having a view through a windscreen of the vehicle 12. In another example, at least one of the one or more vehicle sensors 16 is affixed outside of the vehicle 12, for example, on a roof of the vehicle 12, having a view of the environment surrounding the vehicle 12. It should be understood that various additional types of perception sensors, such as, for example, LiDAR sensors, ultrasonic ranging sensors, radar sensors, and/or time-of-flight sensors are within the scope of the present disclosure. The one or more vehicle sensors 16 are in electrical communication with the controller 14 as discussed above.

The accelerator pedal position sensor 24*a* is used to measure a position of an accelerator pedal of the vehicle 12. In an exemplary embodiment, the accelerator pedal position sensor 24*a* is an electro-mechanical sensor which converts a mechanical movement of the accelerator pedal into an electrical signal. In a non-limiting example, the accelerator pedal position sensor 24*a* includes a potentiometer having at least a first terminal electrically connected to a wiper, and a second terminal. The wiper of the potentiometer is affixed (e.g., by way of a mechanical linkage, a gearset, and/or the like) to the accelerator pedal. Therefore, an electrical resistance measured between the first terminal (i.e., the wiper) and the second terminal is proportional to a position of the accelerator pedal. Accordingly, by measuring the electrical resistance between the first terminal and the second terminal of the potentiometer, the controller 14 determines a position of the accelerator pedal. It should be understood that additional sensors for measuring a position of the accelerator pedal (e.g., rotary encoders, proximity sensors, and the like) are within the scope of the present disclosure.

The brake pedal position sensor 24*b* is used to measure a position of a brake pedal of the vehicle 12. In an exemplary embodiment, the brake pedal position sensor 24*b* is an electro-mechanical sensor which converts a mechanical movement of the brake pedal into an electrical signal. In a non-limiting example, the brake pedal position sensor 24*b* includes a potentiometer having at least a first terminal electrically connected to a wiper, and a second terminal. The wiper of the potentiometer is affixed (e.g., by way of a mechanical linkage, a gearset, and/or the like) to the brake pedal. Therefore, an electrical resistance measured between the first terminal (i.e., the wiper) and the second terminal is proportional to a position of the brake pedal. Accordingly, by measuring the electrical resistance between the first terminal and the second terminal of the potentiometer, the controller 14 determines a position of the brake pedal. It should be understood that additional sensors for measuring a position of the brake pedal (e.g., rotary encoders, proximity sensors, and the like) are within the scope of the present disclosure.

The steering wheel angle sensor 26 is used to measure a position (i.e., an angle) of a steering wheel of the vehicle 12. In an exemplary embodiment, the steering wheel angle sensor 26 is an electro-mechanical sensor which converts a mechanical movement of the steering wheel into an electrical signal. In a non-limiting example, the steering wheel angle sensor 26 includes a potentiometer having at least a first terminal electrically connected to a wiper, and a second terminal. The wiper of the potentiometer is affixed (e.g., by way of a mechanical linkage, a gearset, and/or the like) to the steering wheel. Therefore, an electrical resistance measured between the first terminal (i.e., the wiper) and the second terminal is proportional to a position of the steering wheel. Accordingly, by measuring the electrical resistance between the first terminal and the second terminal of the potentiometer, the controller 14 determines a position and thus a steering wheel angle of the steering wheel. It should be understood that additional sensors for measuring a position of the steering wheel (e.g., rotary encoders, proximity sensors, and the like) are within the scope of the present disclosure.

The IMU 28 is used to determine an orientation, velocity, and gravitational forces acting upon the vehicle 12. In an exemplary embodiment, the IMU 28 includes several sensors, including accelerometers, gyroscopes, and/or magnetometers. In a non-limiting example, the IMU 28 includes three-axis accelerometers and three-axis gyroscopes, which are integrated into a single unit. The accelerometers measure linear acceleration along each axis, while the gyroscopes measure angular velocity about each axis. The IMU 28 processes data from the sensors to calculate the current orientation, speed, heading, yaw rate (i.e., rate of change of heading), and acceleration of the vehicle 12 in three-dimensional space. The IMU 28 is in electrical communication with the controller 14, as discussed above.

The one or more aerodynamic actuators 18 are used to adjust drag on the vehicle 12 and/or adjust aerodynamic downforce on the vehicle 12. In an exemplary embodiment, the one or more aerodynamic actuators 18 include a front aerodynamic actuator 18*a* and a rear aerodynamic actuator 18*b*.

The front aerodynamic actuator 18*a* is used to adjust a front downforce 30*a* at or near a front axle 32*a* of the vehicle 12. In the scope of the present disclosure, the term "downforce" means a force component that is perpendicular to the direction of relative motion of the vehicle 12, i.e., in the longitudinal direction, toward a road surface 40. In the scope of the present disclosure, the term "front downforce" means a downforce applied at or near to the front axle 32*a* of the vehicle 12. The front aerodynamic actuator 18*a* includes a first aerodynamic body 34*a*, a first pivot 36*a*, and a first actuator motor 38*a*.

The first aerodynamic body 34*a* is used to adjust drag and/or aerodynamic downforce by disrupting air movement across the vehicle 12. In an exemplary embodiment, the first aerodynamic body 34*a* is configured as a wing-shaped spoiler. In the present disclosure, the term "wing-shaped" is defined as having a shape of a wing, i.e., a fin having a shape of an airfoil defined by a streamlined cross-sectional shape producing lift for flight or propulsion through a fluid. The term "spoiler" means an aerodynamic device capable of disrupting air movement across the vehicle 12 while the vehicle 12 is in motion, thereby adjusting drag and/or adjusting an aerodynamic downforce on the vehicle 12.

The first pivot 36*a* is used to enable rotational movement between the first aerodynamic body 34*a* and the vehicle 12. In an exemplary embodiment, the first pivot 36*a* is a hinge. In a non-limiting example, the hinge includes a pivot pin (not shown) and two hinge plates (not shown) in mechanical connection with the pivot pin. The pivot pin allows the hinge plates to rotate relative to each other, and the hinge plates are attached to the respective components (i.e., one to the vehicle 12 and one to the first aerodynamic body 34*a*) to facilitate their rotational movement. It should be understood that the first pivot 36*a* may include any mechanical construction or linkage allowing rotational or pivoting movement, including, for example, any combination of hinges, bearings, pivot pins, ball and socket joints, swivel joints, bushings, universal joints, clevis pins, trunnions, and/or the like.

The first actuator motor 38*a* is used to actuate (i.e., move) the first aerodynamic body 34*a* to adjust drag and/or aerodynamic downforce. In an exemplary embodiment, the first actuator motor 38*a* is an electric machine (e.g., a DC-brushed motor, a DC-brushless motor, and AC motor, a linear actuator, and/or the like) coupled to the first aerodynamic body 34*a* through the first pivot 36*a*. In another exemplary embodiment, the first actuator motor 38*a* includes a pneumatic or hydraulic actuator. It should be understood that any actuator operable to actuate (i.e., move) the first aerodynamic body 34*a* is within the scope of the present disclosure. Furthermore, any mechanical construction for coupling the first actuator motor 38*a* to the first aerodynamic body 34*a*, including, for example, chains, belts, pullies, gears, linkages, and/or the like is within the scope of the present disclosure. In a non-limiting example, the first actuator motor 38*a* includes a relative or absolute positioning device such as, for example, a rotary encoder, such that the controller 14 may determine a position of the first actuator motor 38*a* and thus a position of the first aerodynamic body 34*a*. The first actuator motor 38*a* is in electrical communication with the controller 14 and is controllable by the controller 14, as will be discussed in greater detail below.

The rear aerodynamic actuator 18*b* is used to adjust a rear downforce 30*b* at or near a rear axle 32*b* of the vehicle 12. In the scope of the present disclosure, the term "rear downforce" means a downforce applied at or near to the rear axle 32*b* of the vehicle 12. The rear aerodynamic actuator 18*b* includes a second aerodynamic body 34*b*, a second pivot 36*b*, and a second actuator motor 38*b*.

The second aerodynamic body 34*b* is used to adjust drag and/or aerodynamic downforce by disrupting air movement across the vehicle 12. In an exemplary embodiment, the second aerodynamic body 34*b* is configured as a wing-shaped spoiler.

The second pivot 36*b* is used to enable rotational movement between the second aerodynamic body 34*b* and the vehicle 12. In an exemplary embodiment, the second pivot 36*b* is a hinge. In a non-limiting example, the hinge includes a pivot pin (not shown) and two hinge plates (not shown) in mechanical connection with the pivot pin. The pivot pin allows the hinge plates to rotate relative to each other, and the hinge plates are attached to the respective components (i.e., one to the vehicle 12 and one to the second aerodynamic body 34*b*) to facilitate their rotational movement. It should be understood that the second pivot 36*b* may include any mechanical construction or linkage allowing rotational or pivoting movement, including, for example, any combination of hinges, bearings, pivot pins, ball and socket joints, swivel joints, bushings, universal joints, clevis pins, trunnions, and/or the like.

The second actuator motor 38*b* is used to actuate (i.e., move) the second aerodynamic body 34*b* to adjust drag and/or aerodynamic downforce. In an exemplary embodiment, the second actuator motor 38*b* is an electric machine (e.g., a DC-brushed motor, a DC-brushless motor, and AC motor, a linear actuator, and/or the like) coupled to the second aerodynamic body 34*b* through the second pivot 36*b*. In another exemplary embodiment, the second actuator motor 38*b* includes a pneumatic or hydraulic actuator. It should be understood that any actuator operable to actuate (i.e., move) the second aerodynamic body 34*b* is within the scope of the present disclosure. Furthermore, any mechanical construction for coupling the second actuator motor 38*b* to the second aerodynamic body 34*b*, including, for example, chains, belts, pullies, gears, linkages, and/or the like is within the scope of the present disclosure. In a non-limiting example, the second actuator motor 38*b* includes a relative or absolute positioning device such as, for example, a rotary encoder, such that the controller 14 may determine a position of the second actuator motor 38*b* and thus a position of the second aerodynamic body 34*b*. The second actuator motor 38*b* is in electrical communication with the controller 14 and is controllable by the controller 14, as will be discussed in greater detail below.

In an exemplary embodiment, the front aerodynamic actuator 18*a* is located closer to the front axle 32*a* than to the rear axle 32*b*, such that the front aerodynamic actuator 18*a* effectively adjusts the front downforce 30*a*. In a non-limiting example, the front aerodynamic actuator 18*a* is mounted near and/or on a frunk, hood, front bumper, and/or the like of the vehicle 12. The rear aerodynamic actuator 18*b* is located closer to the rear axle 32*b* than to the front axle 32*a*, such that the rear aerodynamic actuator 18*b* effectively adjusts the rear downforce 30*b*. In a non-limiting example, the rear aerodynamic actuator 18*b* is mounted near and/or on a trunk, rear spoiler, rear bumper, and/or the like of the vehicle 12.

Figure 2:
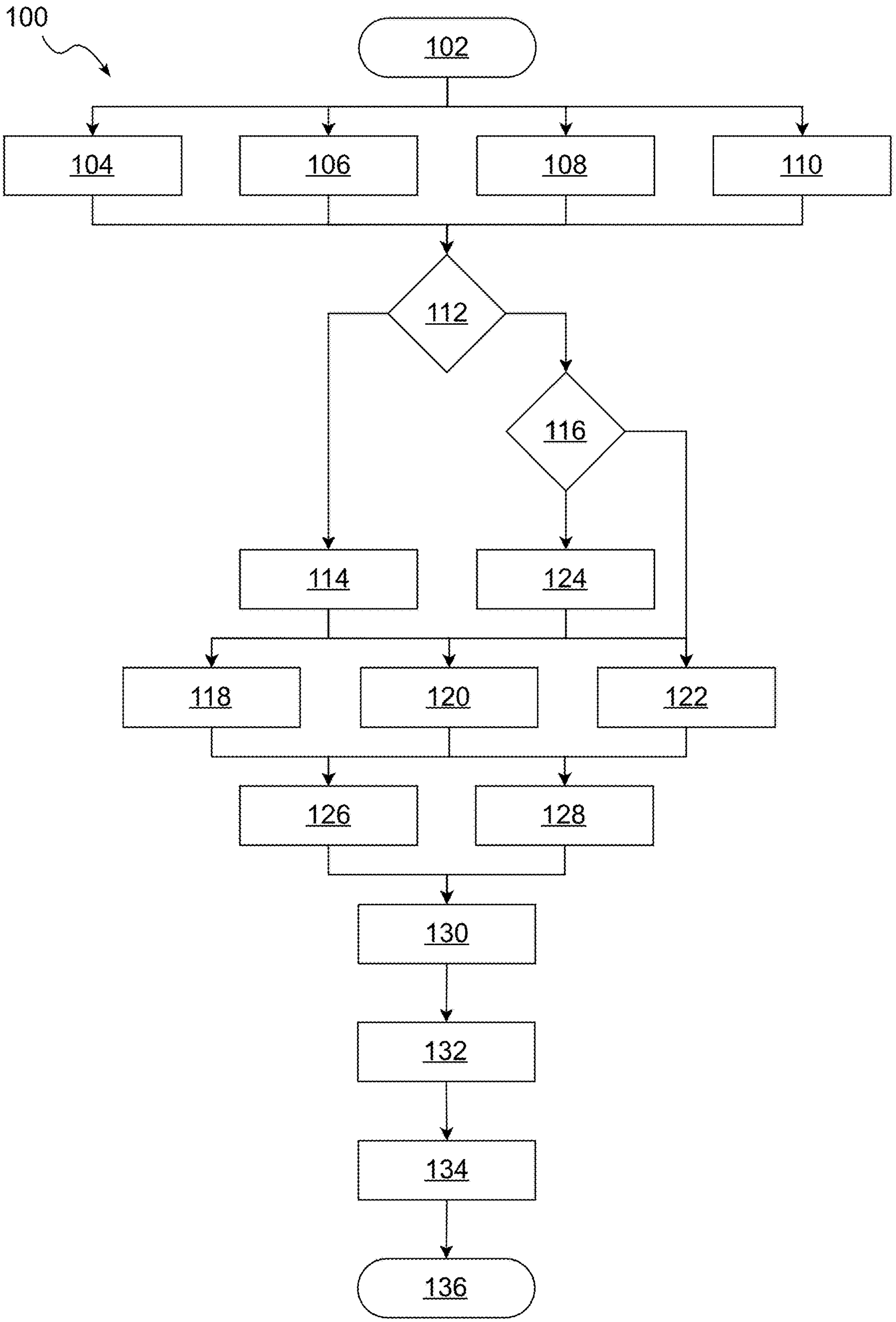
FIG. 2 is a flowchart of a method for active downforce control for a vehicle, according to an exemplary embodiment.

Referring to FIG. 2, a flowchart of the method 100 for active downforce control for a vehicle is shown. The method 100 begins at block 102 and proceeds to blocks 104, 106, 108, and 110.

At block 104, the controller 14 monitors the accelerator pedal position over time. In the scope of the present disclosure, the accelerator pedal position is considered to be one of one or more input parameters. In an exemplary embodiment, the controller 14 uses the accelerator pedal position sensor 24*a* to determine the accelerator pedal position and stores multiple accelerator pedal position measurements in the media 22 of the controller 14. Furthermore, at block 104, the controller 14 determines a magnitude of a change in the accelerator pedal position over time. In a non-limiting example, the controller 14 determines a total change in absolute accelerator pedal position over a predetermined time period, for example, ten seconds. After block 104, the method 100 proceeds to block 112, as will be discussed in greater detail below.

At block 106, the controller 14 monitors the brake pedal position over time. In the scope of the present disclosure, the brake pedal position is considered to be one of the one or more input parameters. In an exemplary embodiment, the controller 14 uses the brake pedal position sensor 24*b* to determine the brake pedal position and stores multiple brake pedal position measurements in the media 22 of the controller 14. Furthermore, at block 106, the controller 14 determines a magnitude of a change in the brake pedal position over time. In a non-limiting example, the controller 14 determines a total change in absolute brake pedal position over a predetermined time period, for example, ten seconds. After block 106, the method 100 proceeds to block 112, as will be discussed in greater detail below.

At block 108, the controller 14 monitors the steering wheel position over time. In the scope of the present disclosure, the steering wheel position is considered to be one of the one or more input parameters. In an exemplary embodiment, the controller 14 uses the steering wheel angle sensor 26 to determine the steering wheel position and stores multiple steering wheel position measurements in the media 22 of the controller 14. Furthermore, at block 108, the controller 14 determines a magnitude of a change in the steering wheel position over time. In a non-limiting example, the controller 14 determines a total change in absolute steering wheel position over a predetermined time period, for example, ten seconds. After block 108, the method 100 proceeds to block 112, as will be discussed in greater detail below.

At block 110, the controller 14 monitors an estimated lateral acceleration over time. In the scope of the present disclosure, the estimated lateral acceleration is an estimated lateral acceleration of the vehicle 12 (i.e., acceleration perpendicular to the direction of travel of the vehicle 12). The estimated lateral acceleration is considered to be one of the one or more input parameters. In an exemplary embodiment, the controller 14 uses the IMU 28 to determine the estimated lateral acceleration. In a non-limiting example, the estimated lateral acceleration of the vehicle 12 is measured directly using the IMU 28 and multiple estimated lateral acceleration measurements are stored in the media 22 of the controller 14. In another exemplary embodiment, the lateral acceleration is estimated based on driver inputs (i.e., accelerator pedal position, brake pedal position, steering angle, and/or the like) and/or vehicle state (i.e., vehicle heading, vehicle speed, and/or the like) using statistical analysis including Kalman filters and/or the like. Furthermore, at block 110, the controller 14 determines a magnitude of a change in the estimated lateral acceleration over time. In a non-limiting example, the controller 14 determines a total change in absolute estimated lateral acceleration over a predetermined time period, for example, ten seconds. After block 110, the method 100 proceeds to block 112.

At block 112, the controller 14 compares the magnitude of the change in the accelerator pedal position over time to a predetermined accelerator pedal position change magnitude threshold (i.e., a predetermined change magnitude threshold). Furthermore, the controller 14 compares the magnitude of the change in the brake pedal position over time to a predetermined brake pedal position change magnitude threshold (i.e., a predetermined change magnitude threshold). Furthermore, the controller 14 compares the magnitude of the change in the steering wheel position over time to a predetermined steering wheel position change magnitude threshold (i.e., a predetermined change magnitude threshold). Furthermore, the controller 14 compares the magnitude of the change in the estimated lateral acceleration over time to a predetermined estimated lateral acceleration change magnitude threshold (i.e., a predetermined change magnitude threshold).

In an exemplary embodiment, if any of the one or more input parameters exceeds (i.e., is greater than or equal to) the corresponding threshold, the method 100 proceeds to block 114. If none of the one or more input parameters exceeds the corresponding threshold, the method 100 proceeds to block 116. In a non-limiting example, if the magnitude of the change in the accelerator pedal position over time exceeds predetermined accelerator pedal position change magnitude threshold, the magnitude of the change in the brake pedal position over time exceeds the predetermined brake pedal position change magnitude threshold, the magnitude of the change in the steering wheel position over time exceeds the predetermined steering wheel position change magnitude threshold, OR the magnitude of the change in the estimated lateral acceleration over time exceeds the predetermined estimated lateral acceleration change magnitude threshold, the method 100 proceeds to block 114. Otherwise, the method 100 proceeds to block 116.

In another exemplary embodiment, if all of the one or more input parameters exceed (i.e., are greater than or equal to) the corresponding threshold, the method 100 proceeds to block 114. If at least one of the one or more input parameters does not exceed the corresponding threshold, the method 100 proceeds to block 116. In a non-limiting example, if the magnitude of the change in the accelerator pedal position over time exceeds predetermined accelerator pedal position change magnitude threshold, the magnitude of the change in the brake pedal position over time exceeds the predetermined brake pedal position change magnitude threshold, the magnitude of the change in the steering wheel position over time exceeds the predetermined steering wheel position change magnitude threshold, AND the magnitude of the change in the estimated lateral acceleration over time exceeds the predetermined estimated lateral acceleration change magnitude threshold, the method 100 proceeds to block 114. Otherwise, the method 100 proceeds to block 116.

At block 114, the controller 14 increases an out-of-phase interaction index. In the scope of the present disclosure, the out-of-phase interaction index quantifies an amount of conflict between the input parameters provided by the driver (i.e., the driver) and the operation of the controller 14 to control the one or more aerodynamic actuators 18. In an exemplary embodiment, the out-of-phase interaction index is a number between zero and one. For example, if the driver is providing input parameters with the intention to cause loss of traction of one or more tires of the vehicle 12 in order to perform a drifting maneuver, but the controller 14 is commanding the one or more aerodynamic actuators 18 to provide increased downforce, thus increasing traction, the out-of-phase interaction index would be considered to be high (i.e., closer to one) because the controller 14 is effectively "working against" the driver.

On the other hand, if the driver is providing input parameters with the intention to cause loss of traction of one or more tires of the vehicle 12 in order to perform a drifting maneuver and the controller 14 is commanding the one or more aerodynamic actuators 18 to provide decreased downforce, thus decreasing traction, the out-of-phase interaction index would be considered to be low (i.e., closer to zero) because the controller 14 is effectively "working with" the driver.

In an exemplary embodiment, at block 114, the controller 14 increases the out-of-phase interaction index by incrementing the out-of-phase interaction index by a predetermined amount (e.g., one tenth). In another exemplary embodiment, the amount by which the out-of-phase interaction index is increased is determined based at least in part on the magnitude of one or more of the one or more input parameters relative to the corresponding thresholds. If the out-of-phase interaction index is equal to its maximum value (i.e., one), the out-of-phase interaction index is not increased at block 114. In an exemplary embodiment, the controller 14 stores an execution timestamp for block 114 in the media 22 of the controller 14. After block 114, the method 100 proceeds to blocks 118, 120, and 122, as will be discussed in greater detail below.

At block 116, the controller 14 determines an elapsed time since the out-of-phase interaction index was last increased. In other words, the controller 14 determines an elapsed time since block 114 was most recently executed. In a non-limiting example, the controller 14 reads the execution timestamp of block 114 from the media 22 of the controller 14 to determine the elapsed time. Furthermore, at block 116, the controller 14 compares the elapsed time to an elapsed time threshold (e.g., one minute). If the elapsed time is less than the elapsed time threshold, the method 100 proceeds to blocks 118, 120, and 122, as will be discussed in greater detail below. If the elapsed time is greater than or equal to the elapsed time threshold, the method 100 proceeds to block 124.

At block 124, the controller 14 resets the out-of-phase interaction index to its minimum value (i.e., zero) in response to determining that the elapsed time is greater than or equal to the elapsed time threshold at block 116. After block 124, the method 100 proceeds to blocks 118, 120, and 122.

At block 118, the controller 14 determines an estimated ride height of the vehicle 12. In the scope of the present disclosure, the estimated ride height refers to an estimated height of a body 50 (FIG. 3) of the vehicle 12 from the road surface 40. In an exemplary embodiment, the estimated ride height includes an estimated front ride height and an estimated rear ride height. In a non-limiting example, to determine the estimated ride height, the controller 14 uses the one or more vehicle sensors 16 to measure quantities such as, for example, front suspension spring deflection, rear suspension spring deflection, tire pressure, steering wheel angle, and/or the like.

The controller 14 then uses data processing, statistics, or filtering techniques such as, for example, Kalman filtering, to determine the estimated ride height based on the quantities measured using the one or more vehicle sensors 16. The term "estimated" ride height is used because the actual ride height may vary over time due to changes in loading, acceleration, road surface characteristics, downforce, and/or the like. Therefore, the estimated ride height is determined by taking into account various factors which influence the ride height of the vehicle 12 at any given time. After block 118, the method 100 proceeds to blocks 126 and 128, as will be discussed in greater detail below.

At block 120, the controller 14 determines a raw longitudinal acceleration of the vehicle 12. In the scope of the present disclosure, the raw longitudinal acceleration is a longitudinal acceleration of the vehicle 12 (i.e., acceleration in the direction of travel of the vehicle 12). In the scope of the present disclosure, the term "raw" indicates that the raw longitudinal acceleration is not substantially preprocessed or filtered. In an exemplary embodiment, the controller 14 uses the IMU 28 to determine the raw longitudinal acceleration. In a non-limiting example, the raw longitudinal acceleration of the vehicle 12 is measured directly using the IMU 28 and multiple raw longitudinal acceleration measurements are stored in the media 22 of the controller 14. In another exemplary embodiment, the raw longitudinal acceleration is estimated based on driver inputs (i.e., accelerator pedal position, brake pedal position, steering angle, and/or the like) and/or vehicle state (i.e., vehicle heading, vehicle speed, and/or the like) using statistical analysis including Kalman filters and/or the like. After block 120, the method 100 proceeds to blocks 126 and 128, as will be discussed in greater detail below.

At block 122, the controller 14 determines a raw longitudinal tire force of the vehicle 12. In the scope of the present disclosure, the raw longitudinal tire force is a force acting longitudinally on one or more tires of the vehicle 12 (i.e., tire force in the direction of travel of the vehicle 12). In the scope of the present disclosure, the term "raw" indicates that the raw longitudinal tire force is not substantially preprocessed or filtered. In an exemplary embodiment, the controller 14 uses the IMU 28 to determine the raw longitudinal tire force. In a non-limiting example, the raw longitudinal tire force of the vehicle 12 is measured directly using the IMU 28 and multiple raw longitudinal tire force measurements are stored in the media 22 of the controller 14. In another exemplary embodiment, the raw longitudinal tire force is estimated based on driver inputs (i.e., accelerator pedal position, brake pedal position, steering angle, and/or the like) and/or vehicle state (i.e., vehicle heading, vehicle speed, wheel speed, wheel slip rate, and/or the like) using statistical analysis including Kalman filters and/or the like. After block 122, the method 100 proceeds to blocks 126 and 128.

At block 126, determines a filtered longitudinal acceleration of the vehicle 12. In the scope of the present disclosure, the filtered longitudinal acceleration is determined by filtering the raw longitudinal acceleration determined at block 120 to remove disturbances. The filtered longitudinal acceleration is considered to be one of one or more active downforce control inputs, as will be discussed in greater detail below. In an exemplary embodiment, the filtered longitudinal acceleration is determined by filtering the raw longitudinal acceleration based at least in part on the out-of-phase interaction index. In general, a "strength" of the filtering (i.e., an amount of data smoothing and/or an amount of data lost/ignored by the filtering) varies directly with the out-of-phase interaction index, such that a higher out-of-phase interaction index results in more filtering.

In a non-limiting example, the filtered longitudinal acceleration is determined by taking a moving average of the raw longitudinal acceleration. For example, a period of the moving average (i.e., a number of samples used to calculate the moving average, also known as window size) is determined based at least in part on the out-of-phase interaction index. In a non-limiting example, the period of the moving average varies directly (e.g., proportionally) with the out-of-phase interaction index. It should be understood that various additional filtering techniques, including, for example, simple moving average (SMA), weighted moving average (WMA), exponential moving average (EMA), median filters, Gaussian filters, Savitzky-Golay filters, Kalman filters, and/or the like may be used without departing from the scope of the present disclosure. After block 126, the method 100 proceeds to block 130, as will be discussed in greater detail below.

At block 128, determines a filtered longitudinal tire force of the vehicle 12. In the scope of the present disclosure, the filtered longitudinal tire force is determined by filtering the raw longitudinal tire force determined at block 122 to remove disturbances. The filtered longitudinal tire force is considered to be one of the one or more active downforce control inputs, as will be discussed in greater detail below. In an exemplary embodiment, the filtered longitudinal tire force is determined by filtering the raw longitudinal tire force based at least in part on the out-of-phase interaction index. In general, a "strength" of the filtering (i.e., an amount of data smoothing and/or an amount of data lost/ignored by the filtering) varies directly with the out-of-phase interaction index, such that a higher out-of-phase interaction index results in more filtering.

In a non-limiting example, the filtered longitudinal tire force is determined by taking a moving average of the raw longitudinal tire force. For example, a period of the moving average (i.e., a number of samples used to calculate the moving average, also known as window size) is determined based at least in part on the out-of-phase interaction index. In a non-limiting example, the period of the moving average varies directly (e.g., proportionally) with the out-of-phase interaction index. It should be understood that various additional filtering techniques, including, for example, simple moving average (SMA), weighted moving average (WMA), exponential moving average (EMA), median filters, Gaussian filters, Savitzky-Golay filters, Kalman filters, and/or the like may be used without departing from the scope of the present disclosure. After block 128, the method 100 proceeds to block 130.

At block 130, the controller 14 determines a modeled ride height of the vehicle 12. In the scope of the present disclosure, the modeled ride height refers to a modeled height of a body 50 (FIG. 3) of the vehicle 12 from the road surface 40 determined using a mathematical model. In an exemplary embodiment, the modeled ride height includes a front modeled ride height and a rear modeled ride height.

Figure 3:
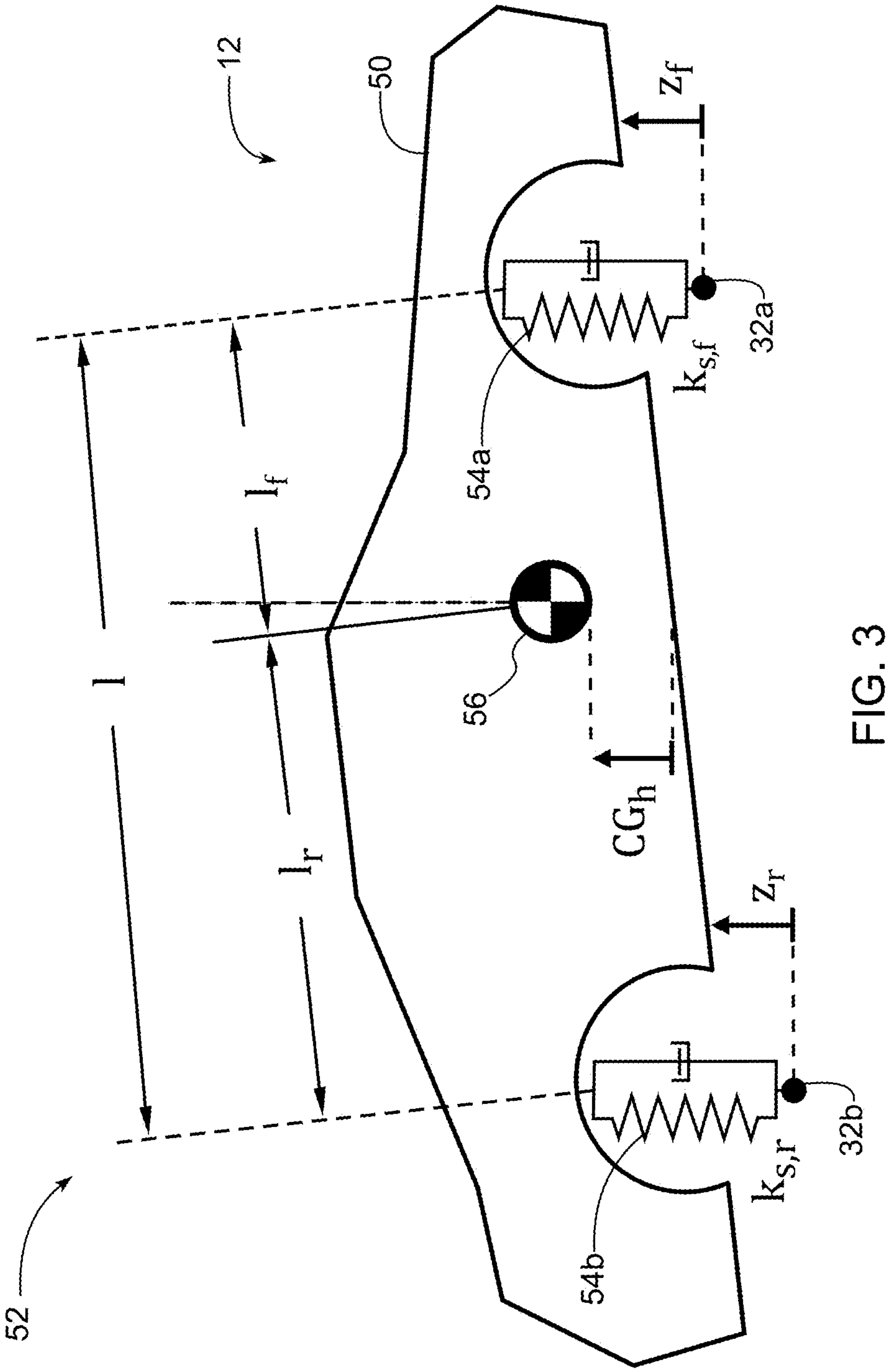
FIG. 3 is a schematic diagram of a simplified vehicle model, according to an exemplary embodiment.

Referring to FIG. 3, a schematic diagram of a simplified vehicle model 52 of the vehicle 12 is shown. The simplified vehicle model 52 includes the body 50 of the vehicle 12, the front axle 32*a* of the vehicle 12, the rear axle 32*b* of the vehicle 12, a front spring 54*a* of the vehicle 12, a rear spring 54*b* of the vehicle 12, and a center of mass 56 of the vehicle 12. With reference to FIG. 3 and continued reference to FIGS. 1-2, in an exemplary embodiment, to determine the modeled ride height, the controller 14 uses a mathematical relation which neglects the effects of sudden driver inputs (i.e., as detected at block 112) and road disturbances. In a non-limiting example, the controller 14 uses the following formulas to determine the modeled ride height:

$$\frac{\frac{-m*g*l_r}{l}+\frac{A_x*m*CG_h}{l}-F_{d,f}+F_{sp,f}}{K_{s,f}}=Z_f \tag{1}$$

$$\frac{\frac{-m*g*l_f}{l}-\frac{A_x*m*CG_h}{l}-F_{d,r}+F_{sp,r}}{K_{s,r}}=Z_r \tag{2}$$

$$RH_{m,f}=g_f*Z_f+RH_{0,f} \tag{3}$$

$$RH_{m,r}=g_r*Z_r+RH_{0,r} \tag{4}$$

where m is the mass of the vehicle 12, g is the acceleration due to gravity, $l_r$ is a longitudinal distance between the rear axle 32*b* and the center of mass 56 of the vehicle 12, l is the wheelbase of the vehicle 12, $A_x$ is the filtered longitudinal acceleration determined at block 126, $CG_h$ is a vertical location of the center of mass 56 of the vehicle 12, $F_{d,f}$ is the front downforce 30*a*, $F_{sp,f}$ is a front spring preload of the front spring 54*a*, $K_{s,f}$ is a front spring constant of the front spring 54*a*, and $Z_f$ is a vertical location of the front axle 32*a*.

Furthermore, $l_f$ is a longitudinal distance between the front axle 32*a* and the center of mass 56 of the vehicle 12, $F_{d,r}$ is the rear downforce 30*b*, $F_{sp,r}$ is a rear spring preload of the rear spring 54*b*, $K_{s,r}$ is a rear spring constant of the rear spring 54*b*, and $Z_r$ is a vertical location of the rear axle 32*b*. Furthermore, $RH_{m,f}$ is the front modeled ride height, $g_f$ is a front modeled ride height gain constant, and $RH_{0,f}$ is a front ride height offset. The front modeled ride height gain constant and the front ride height offset are predetermined dependent on suspension geometry. Furthermore, $RH_{m,r}$ is the rear modeled ride height, $g_r$ is a rear modeled ride height gain constant, and $RH_{0,r}$ is a rear ride height offset. The rear modeled ride height gain constant and the rear ride height offset are predetermined dependent on suspension geometry.

It should be understood that Equations 1-4 presented above are merely exemplary in nature, and that various alternative or additional mathematical and/or physical relations or modeling techniques may be used to determine the modeled ride height within the scope of the present disclosure. The term "modeled" ride height is used because the actual ride height may vary over time due to changes in loading, acceleration, road surface characteristics, downforce, and/or the like. The modeled ride height is determined based on Newtonian physics using a mathematical relation (e.g., based on vehicle load transfer) which neglects the effects of sudden driver inputs (i.e., as detected at block 112) and road disturbances. Referring again to FIG. 2, after block 130, the method 100 proceeds to block 132.

At block 132, the controller 14 determines a blended ride height. In the scope of the present disclosure, the blended ride height is a blending of the modeled ride height determined at block 130 and the estimated ride height determined at block 118. In an exemplary embodiment, the blended ride height includes a blended front ride height and a blended rear ride height. The blended ride height is considered to be one of the one or more active downforce control inputs, as will be discussed in greater detail below. In an exemplary embodiment, the blended ride height is determined based at least in part on the modeled ride height determined at block 130, the estimated ride height determined at block 118, and the out-of-phase interaction index.

In a non-limiting example, the blended ride height is a weighted average of the modeled ride height and the estimated ride height, wherein the weighting is determined based on the out-of-phase interaction index. In another non-limiting example, the blended ride height is determined using a formula:

$$RH_B = RH_m * i + RH_e * (1 - i) \quad (5)$$

where $RH_B$ is the blended ride height (i.e., either the blended front ride height or the blended rear ride height), $RH_m$ is the modeled ride height determined at block 130 (i.e., either the modeled front ride height or the modeled rear ride height), i is the out-of-phase interaction index, and $RH_e$ is the estimated ride height determined at block 118 (i.e., either the estimated front ride height or the estimated rear ride height). It should be understood that various additional mathematical relations may be used to blend the modeled ride height and estimated ride height based on the out-of-phase interaction index to determine the blended ride height without departing from the scope of the present disclosure. After block 132, the method 100 proceeds to block 134.

At block 134, the controller 14 controls the one or more aerodynamic actuators 18 based at least in part on the one or more active downforce control inputs (i.e., the filtered longitudinal acceleration determined at block 126, the filtered longitudinal tire force determined at block 128, and the blended ride height determined at block 132). In an exemplary embodiment, the controller 14 executes an active downforce control program saved in the media 22 of the controller 14. In an exemplary embodiment, the active downforce control program is configured to receive the one or more active downforce control inputs, determine a requested front downforce **30*a* and a requested rear downforce 30*b*, and determine a position setpoint for the first actuator motor 38*a* based on the requested front downforce 30*a* and a position setpoint for the second actuator motor 38*b* based on the requested rear downforce 30*b***.

In a non-limiting example, the controller 14 controls the one or more aerodynamic actuators 18 as discussed in U.S. application Ser. No. 18/787,480, titled "ACTIVE DOWNFORCE CONTROL FOR DRIFTING MANEUVERS", filed on Jul. 29, 2024, the entire contents of which is hereby incorporated by reference. In another non-limiting example, the controller 14 controls the one or more aerodynamic actuators 18 as discussed in U.S. application Ser. No. 18/350,508, titled "METHOD AND SYSTEM FOR DETERMINING THE DESIRED TIRE GRIP IN ACTIVE DOWNFORCE CONTROL", filed on Jul. 11, 2023, the entire contents of which is hereby incorporated by reference. It should be understood that various additional and/or alternative methods for controlling the one or more aerodynamic actuators 18 based at least in part on the one or more active downforce control inputs are within the scope of the present disclosure. After block 134, the method 100 proceeds to enter a standby state at block 136.

In an exemplary embodiment, the controller 14 repeatedly exits the standby state 136 and restarts the method 100 at block 102. In a non-limiting example, the controller 14 exits the standby state 136 and restarts the method 100 on a timer, for example, every three hundred milliseconds.

The system 10 and method 100 of the present disclosure offer several advantages. Using the system 10 and method 100 of the present disclosure, out-of-phase interaction between the driver and the active downforce control program of the controller 14 may be identified and quantified using the out-of-phase interaction index. The out-of-phase interaction index is subsequently used to adjust the active downforce control inputs to the active downforce control program such that the active downforce control program does not counteract the one or more input parameters provided by the driver (i.e., accelerator pedal position, brake pedal position, steering wheel position, etc.). Furthermore, the system 10 and method 100 may be used to adjust the active downforce control inputs such as to enhance and/or complement the one or more input parameters provided by the driver. Accordingly, using the system 10 and method 100 of the present disclosure, driver control, comfort, and enjoyment is enhanced while maintaining vehicle performance.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for active downforce control for a vehicle, the method comprising:
- determining an out-of-phase interaction index between a driver of the vehicle and a controller, wherein the controller is configured to control one or more aerodynamic actuators;
- determining one or more active downforce control inputs based at least in part on the out-of-phase interaction index; and
- controlling the one or more aerodynamic actuators based at least in part on the one or more active downforce control inputs.

2. The method of claim 1, wherein determining the out-of-phase interaction index further comprises:
- monitoring one or more input parameters over time;
- determining a magnitude of a change in one of the one or more input parameters; and
- determining the out-of-phase interaction index based at least in part on the magnitude of the change in the one of the one or more input parameters.

3. The method of claim 2, wherein monitoring the one or more input parameters over time further comprises:
- monitoring an accelerator pedal position over time;
- monitoring a brake pedal position over time; and
- monitoring an estimated lateral acceleration of the vehicle over time.

4. The method of claim 2, wherein determining the out-of-phase interaction index further comprises:
- comparing the magnitude of the change in the one of the one or more input parameters to a predetermined change magnitude threshold;
- increasing the out-of-phase interaction index in response to determining that the magnitude of the change in the one of the one or more input parameters is greater than or equal to the predetermined change magnitude threshold;
- determining an elapsed time since the out-of-phase interaction index was last increased;
- comparing the elapsed time to an elapsed time threshold; and
- resetting the out-of-phase interaction index to zero in response to determining that the elapsed time is greater than or equal to the elapsed time threshold.

5. The method of claim 1, wherein determining the one or more active downforce control inputs further comprises:

determining an estimated ride height using one or more vehicle sensors;

determining a modeled ride height;

determining a blended ride height based at least in part on the estimated ride height, the modeled ride height, and the out-of-phase interaction index; and determining the one or more active downforce control inputs, wherein the one or more active downforce control inputs includes at least the blended ride height.

6. The method of claim 5, wherein determining the modeled ride height further comprises:

determining the modeled ride height using a mathematical relation which neglects effects of sudden driver inputs and road disturbances.

7. The method of claim 6, wherein determining the modeled ride height further comprises:

determining a front modeled ride height based at least in part on a filtered longitudinal acceleration, a front downforce, a front spring preload, and a front spring constant; and determining a rear modeled ride height based at least in part on the filtered longitudinal acceleration, a rear downforce, a rear spring preload, and a rear spring constant.

8. The method of claim 5, wherein determining the blended ride height further comprises:

determining the blended ride height using a formula:

$$RH_B = RH_m * i + RH_e * (1 - i)$$

wherein $RH_B$ is the blended ride height, $RH_m$ is the modeled ride height, i is the out-of-phase interaction index, and $RH_e$ is the estimated ride height, and wherein the out-of-phase interaction index is a number between zero and one.

9. The method of claim 1, wherein determining the one or more active downforce control inputs further comprises:

determining a raw longitudinal acceleration;

determining a filtered longitudinal acceleration based at least in part on the raw longitudinal acceleration and the out-of-phase interaction index; and determining the one or more active downforce control inputs, wherein the one or more active downforce control inputs includes at least the filtered longitudinal acceleration.

10. The method of claim 1, wherein determining the one or more active downforce control inputs further comprises:

determining a raw longitudinal tire force;

determining a filtered longitudinal tire force based at least in part on the raw longitudinal tire force and the out-of-phase interaction index; and determining the one or more active downforce control inputs, wherein the one or more active downforce control inputs includes at least the filtered longitudinal tire force.

11. A system for active downforce control for a vehicle, the system comprising:

one or more vehicle sensors;

one or more aerodynamic actuators;

a controller in electrical communication with the one or more vehicle sensors and the one or more aerodynamic actuators, wherein the controller is programmed to:

determine an out-of-phase interaction index between a driver of the vehicle and the controller using the one or more vehicle sensors;

determine one or more active downforce control inputs based at least in part on the out-of-phase interaction index; and control the one or more aerodynamic actuators based at least in part on the one or more active downforce control inputs.

12. The system of claim 11, wherein to determine the out-of-phase interaction index, the controller is further programmed to:

monitor one or more input parameters over time using the one or more vehicle sensors;

determine a magnitude of a change in one of the one or more input parameters; and determine the out-of-phase interaction index based at least in part on the magnitude of the change in the one of the one or more input parameters.

13. The system of claim 12, wherein to monitor the one or more input parameters over time, the controller is further programmed to:

monitor an accelerator pedal position over time using an accelerator pedal position sensor of the one or more vehicle sensors;

monitor a brake pedal position over time using a brake pedal position sensor of the one or more vehicle sensors; and monitor an estimated lateral acceleration of the vehicle over time using the one or more vehicle sensors.

14. The system of claim 13, wherein to determine the out-of-phase interaction index, the controller is further programmed to:

compare the magnitude of the change in the one of the one or more input parameters to a predetermined change magnitude threshold;

increase the out-of-phase interaction index in response to determining that the magnitude of the change in the one of the one or more input parameters is greater than or equal to the predetermined change magnitude threshold;

determine an elapsed time since the out-of-phase interaction index was last increased;

compare the elapsed time to an elapsed time threshold; and reset the out-of-phase interaction index to zero in response to determining that the elapsed time is greater than or equal to the elapsed time threshold.

15. The system of claim 14, wherein to determine the one or more active downforce control inputs, the controller is further programmed to:

determine a raw longitudinal acceleration;

determine a filtered longitudinal acceleration based at least in part on the raw longitudinal acceleration and the out-of-phase interaction index;

determine a raw longitudinal tire force;

determine a filtered longitudinal tire force based at least in part on the raw longitudinal tire force and the out-of-phase interaction index;

determine an estimated ride height using the one or more vehicle sensors;

determine a modeled ride height;

determine a blended ride height based at least in part on the estimated ride height, the modeled ride height, and the out-of-phase interaction index; and determine the one or more active downforce control inputs, wherein the one or more active downforce control inputs includes at least the filtered longitudinal acceleration, the filtered longitudinal tire force, and the blended ride height.

16. The system of claim 15, wherein to determine the modeled ride height, the controller is further programmed to:

determine a front modeled ride height based at least in part on a filtered longitudinal acceleration, a front downforce, a front spring preload, and a front spring constant; and determine a rear modeled ride height based at least in part on the filtered longitudinal acceleration, a rear downforce, a rear spring preload, and a rear spring constant.

17. The system of claim 16, wherein to determine the blended ride height, the controller is further programmed to:

determine the blended ride height using a formula:

$$RH_B = RH_m * i + RH_e * (1 - i)$$

wherein $RH_B$ is the blended ride height, $RH_m$ is the modeled ride height, i is the out-of-phase interaction index, and $RH_e$ is the estimated ride height, and wherein the out-of-phase interaction index is a number between zero and one.

18. A method for active downforce control for a vehicle, the method comprising:

monitoring one or more input parameters over time using one or more vehicle sensors;

determining a magnitude of a change in one of the one or more input parameters;

determining an out-of-phase interaction index based at least in part on the magnitude of the change in the one of the one or more input parameters;

determining one or more active downforce control inputs based at least in part on the out-of-phase interaction index; and controlling one or more aerodynamic actuators based at least in part on the one or more active downforce control inputs.

19. The method of claim 18, wherein determining the out-of-phase interaction index further comprises:

comparing the magnitude of the change in the one of the one or more input parameters to a predetermined change magnitude threshold;

increasing the out-of-phase interaction index in response to determining that the magnitude of the change in the one of the one or more input parameters is greater than or equal to the predetermined change magnitude threshold;

determining an elapsed time since the out-of-phase interaction index was last increased;

comparing the elapsed time to an elapsed time threshold; and resetting the out-of-phase interaction index to zero in response to determining that the elapsed time is greater than or equal to the elapsed time threshold.

20. The method of claim 19, wherein determining the one or more active downforce control inputs further comprises:

determining an estimated ride height using one or more vehicle sensors;

determining a modeled ride height using a mathematical relation which neglects effects of sudden driver inputs and road disturbances;

determining a blended ride height using a formula:

$$RH_B = RH_m * i + RH_e * (1 - i)$$

wherein $RH_B$ is the blended ride height, $RH_m$ is the modeled ride height, i is the out-of-phase interaction index, and $RH_e$ is the estimated ride height, and wherein the out-of-phase interaction index is a number between zero and one;

determining a raw longitudinal acceleration;

determining a filtered longitudinal acceleration based at least in part on the raw longitudinal acceleration and the out-of-phase interaction index;

determining a raw longitudinal tire force;

determining a filtered longitudinal tire force based at least in part on the raw longitudinal tire force and the out-of-phase interaction index; and determining the one or more active downforce control inputs, wherein the one or more active downforce control inputs includes at least the blended ride height, the filtered longitudinal acceleration, and the filtered longitudinal tire force.

* * * * *